Figure 4:
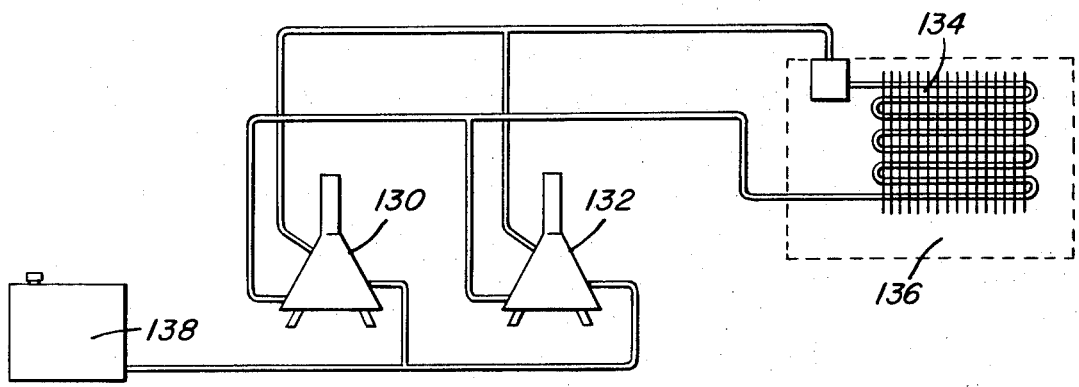

United States Patent [19]
Wetzel

[11] 3,828,566
[45] Aug. 13, 1974

[54] DRY ADSORPTION REFRIGERATION SYSTEM

[76] Inventor: Charles W. Wetzel, 2237 Oriole St., New Orleans, La. 70122

[22] Filed: Feb. 5, 1973

[21] Appl. No.: 329,821

[52] U.S. Cl.............. 62/143, 62/106, 62/145, 62/146, 62/238, 62/243, 62/477, 62/480, 62/485, 165/128
[51] Int. Cl............................ F25b 17/08
[58] Field of Search ............ 62/144, 145, 146, 148, 62/238, 106, 477, 480, 481, 485, 506; 165/128

[56] References Cited
UNITED STATES PATENTS

| | | | |
|---|---|---|---|
| 1,854,778 | 4/1932 | Boving | 62/481 X |
| 2,067,678 | 1/1937 | Nesselmann | 62/480 |
| 2,455,401 | 12/1948 | Brause | 62/481 X |

*Primary Examiner*—William F. O'Dea
*Assistant Examiner*—Peter D. Ferguson
*Attorney, Agent, or Firm*—Clarence A. O'Brien; Harvey B. Jacobson

[57] ABSTRACT

Dry adsorption refrigeration apparatus includes a plurality of compression/heating units packed with silica gel, a condenser, an expansion valve and an evaporator, which apparatus can utilize waste energy, such as internal combustion exhaust energy, to excite and operate the refrigeration cycle. The apparatus operates at temperatures and pressures approaching the critical values for the refrigerant, thereby allowing condensation to take place at ambient temperatures by natural convective currents, i.e., without fans or cooling liquids. Convective cooling can be enhanced by arranging the apparatus in a generally conical configuration wherein the condensing coils are disposed adjacent the base of the cone and the compression/heating units are situated above the condenser coils such that ambient air enters the bottom of the cone, flows upward over the coils and units and exits through a flue opening in the apex of the cone.

11 Claims, 5 Drawing Figures

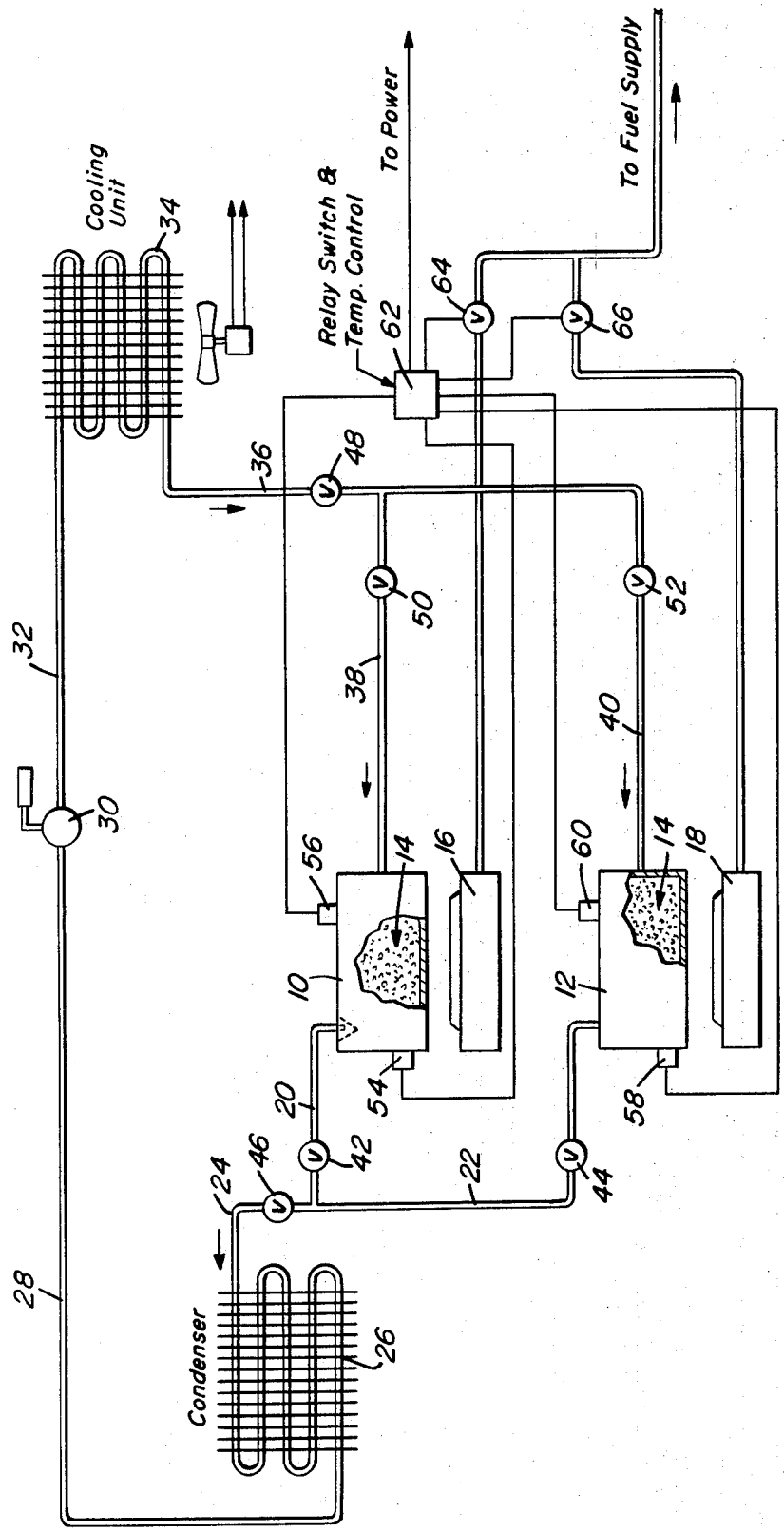

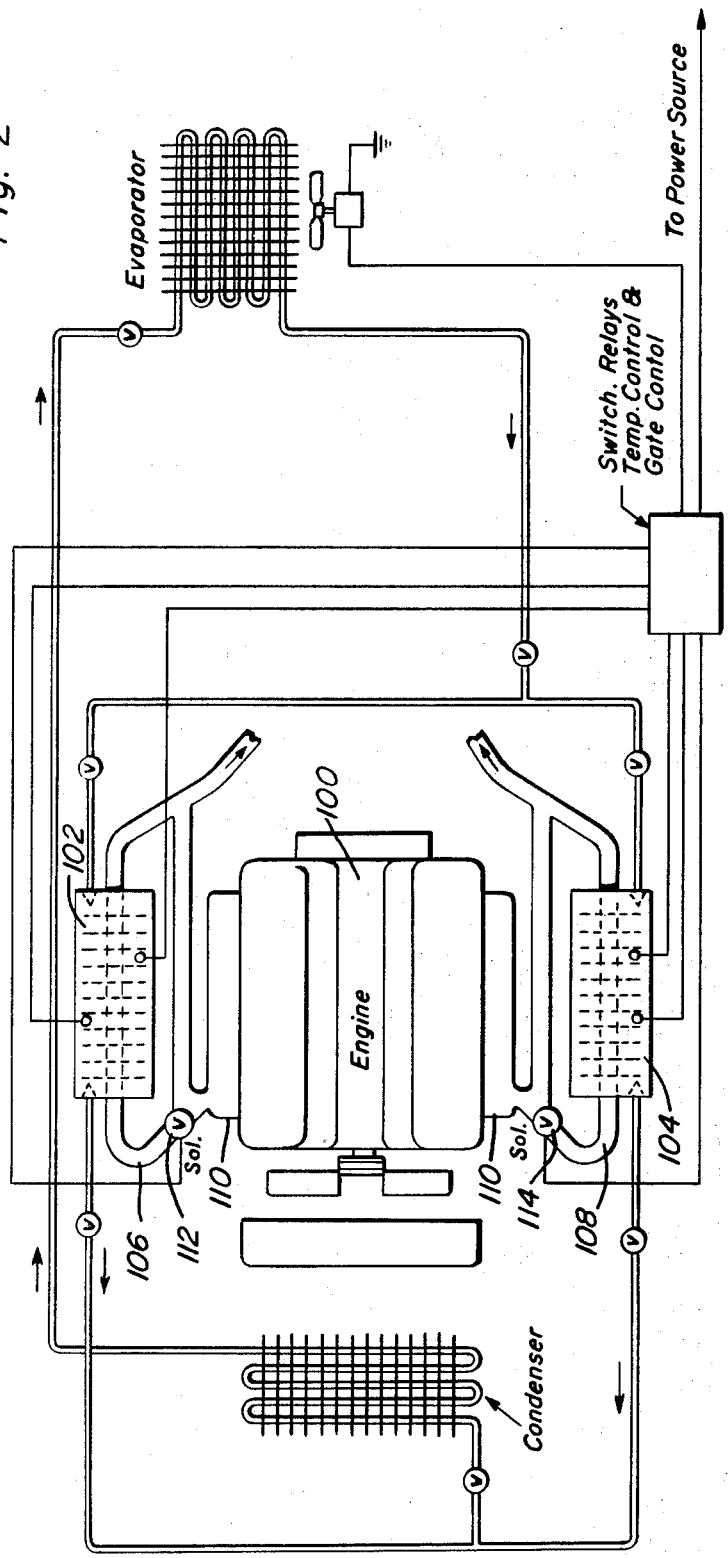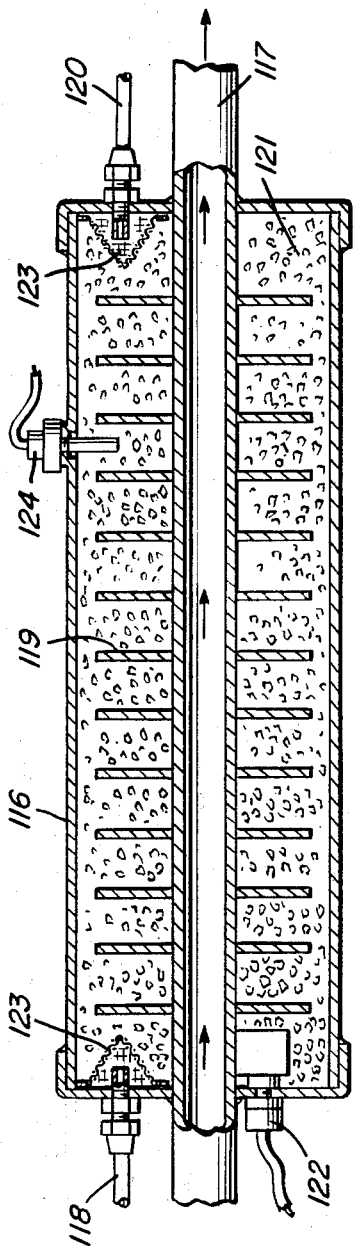

3,828,566

SHEET 3 OF 3

DRY ADSORPTION REFRIGERATION SYSTEM

The present invention relates to dry adsorption refrigeration apparatus, and, more particularly, to improved apparatus which operates at relatively high temperatures and pressures, approaching the critical values for the refrigerant.

Adsorption or absorption refrigeration apparatus are well known. As shown in U.S. Pat. No. 2,024,083 — Young, such apparatus typically includes a plurality of adsorbing units containing materials which are adsorbent and/or absorbent to liquid refrigerants. The units are adapted to be heated to pressurize the refrigerant and to drive it from the adsorbent or absorbent material through connected piping to a suitable water or air cooled condensing coil where the heat content of the refrigerant is reduced. From the condenser the refrigerant is piped through a standard expansion valve — where it is reduced in pressure and temperature — to evaporator coils, where it absorbs heat from the body or space to be refrigerated. From the evaporator coils, the refrigerant returns to the adsorbing units connected to the low pressure side of the apparatus for re-adsorption and re-cycling.

Apparatus such as is described in the Young patent, although well known for years, is generally uneconomical in operation by virtue of the high cost of energy to heat the adsorbers and to cool the condensing coils.

Accordingly, it is an object of the present invention to provide a refrigeration system which has reduced operating costs by virtue of using waste energy in the form of heat, e.g., residual heat from engines and other devices, or heat derived from natural or manufactured gas or petroleum, for refrigerant circulation rather than utilizing electrical energy or direct engine drive to power the refrigerant cycle.

It is another object of the invention to provide a refrigeration system which eliminates the requirement for pumps, cooling fans and motors for high pressure side condenser cooling or for lowering the compression/heater pressure and temperature.

It is still another object of this invention to reduce costs and increase efficiency of refrigeration systems by providing apparatus which operates at high temperatures and pressures, close to the refrigerant critical values, and thereby permits refrigerant condensation by natural means, without mechanical or liquid cooling.

Other objects and advantages will become apparent from the following description and appended claims.

Briefly stated, in accordance with the aforesaid objects, the present invention provides absorption or adsorption refrigeration apparatus which includes a plurality of compression/heating chambers packed with a suitable adsorbent material, such as silica gel, connected to a convection cooled condensing coil, an expansion or throttle valve and evaporator coils. In addition, means are provided to control the heating and cooling of the compression/heating chambers responsive to temperature sensing means associated with the chambers. By operating the refrigeration apparatus at a relatively high pressure and temperature, i.e., relative to the condensing coil temperatures used in the conventional refrigeration systems, the condensing portion of the cycle can be accomplished at ambient temperatures and without fans or cooling liquids to assist in cooling the condensing coils. Natural convection cooling can be enhanced by arranging the refrigeration system components in a generally conical configuration with the condensing coils at the base of the cone and the compression/heating units disposed above the coils to draw ambient air in through the base of the cone, upwardly over the condensing coils and units and out through the flue at the apex of the cone.

In a particularly preferred embodiment of the present invention the refrigerant apparatus is used in conjunction with an internal combustion engine and utilizes the engine waste exhaust heat to excite and operate the refrigeration cycle.

The invention will be better understood from the following description taken in conjunction with the accompanying drawings.

FIG. 1 schematically illustrates the arrangement of the dry adsorption refrigeration apparatus of the present invention.

FIG. 2 schematically illustrates the apparatus of FIG. 1 showing an arrangement wherein heat is supplied by an internal combustion engine exhaust.

FIG. 3 is a longitudinal sectional view through a compression/heating unit adapted to be heated by an internal combustion engine exhaust.

FIG. 4 schematically illustrates a typical field refrigeration system layout in accordance with the present invention.

Figure 5:
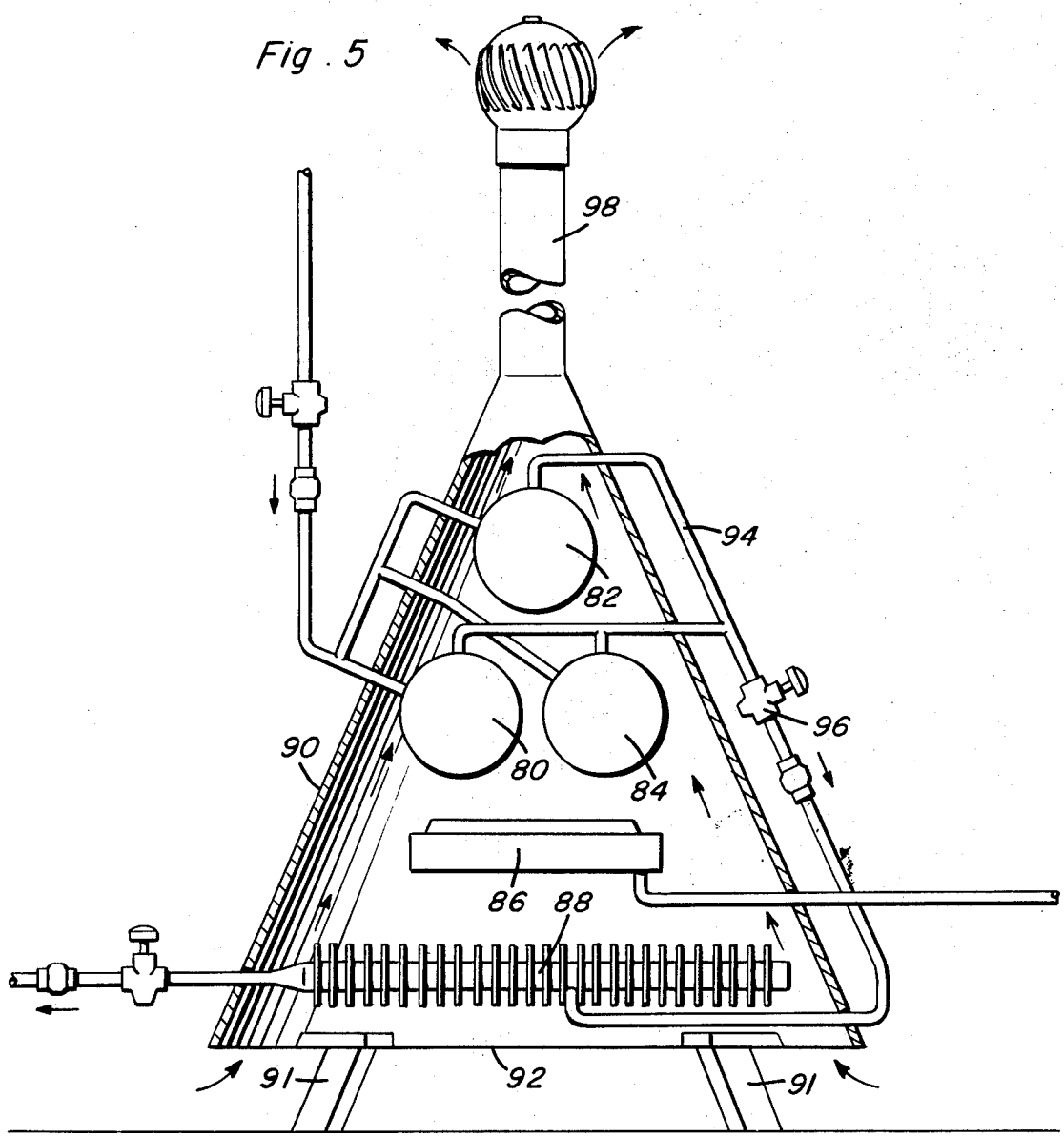

FIG. 5 is a front elevation, partly broken away, of a conical arrangement of the dry adsorption refrigeration apparatus of the present invention.

The present refrigeration system is an improvement over the known types of absorption or adsorption refrigeration systems, particularly in that the efficiency of the system and its economy of operation is greatly enhanced by operating at temperatures close to the critical temperature of the refrigerant being used. Such high temperatures and correspondingly high pressures permit refrigerant condensation without mechanical or liquid cooling. The present refrigeration system may be used in cooling food, air conditioning (automotive, marine, industrial and home) and remote field-type, self-sustained refrigeration.

The refrigeration system of the present invention will be better understood by reference to FIG. 1 wherein two compression/heating chambers 10, 12, are shown, each packed with a granulated adsorbent 14 (121 in FIG. 3) such as silica gel. One preferred type of silica gel is Grade No. 05, particle size 6–16 (Tyler sieve) such as is marketed by the Davison Chemical Company, Technical Bulletin L–4–1163. Depending upon the size of the refrigerant system involved, other grades and sizes of silica gel may be used. Associated with each of the chambers 10, 12 are heating units 16, 18, respectively, which may utilize heat from any source, but preferably from a low-cost source, such as waste heat. Connected to each of the compression/heating units 10, 12 by piping lines 20, 22, respectively, and common line 24 is a condenser unit 26 adapted to be cooled by flow thereover of air at ambient temperatures. The condenser is connected by piping 28, in a conventional manner, to an expansion or throttling valve 30 which reduces the refrigerant pressure and temperature before it enters evaporative cooling unit 34 via piping 32. Cooling unit 34 is a standard unit disposed in heat transfer proximity with the space to be refrigerated in a conventional manner. In the cooling unit 34 the refrigerant is heated (and partially vaporized) and returns via common piping line 36 and lines 38 and 40 to the compression/heating units 10, 12 respectively. Check valves 42 and 44 in lines 20 and 22 respectively and check valve 46 in line 24 direct the flow of refrigerant from the units 10, 12 to condenser 26 in a manner which will be described more fully hereinafter. Likewise, check valves 48, 50 and 52, in lines 36, 38 and 40, respectively, control flow from cooling unit 34 back to compression/heating units 10, 12.

It will be appreciated that the refrigeration system herein described consists of a high pressure side which includes the compression/heating unit 10 or 12 which is being heated (only one unit is heated at any one time), the piping 20 or 22 and check valve 42 or 44 associated with the heated unit, check valve 46, common line 24, condenser 26, and piping 28. Throttle valve 30 separates the high pressure side from the low pressure side. The latter includes piping 32 from throttle valve 30, cooling unit 34, common line 36 and check valve 48 therein, and the non-heated compression/heating unit 10 or 12 and its associated piping 38 or 40 and check valve 50 or 52.

The initial charge of refrigerant to compression/heating units 10, 12 should be made at a pressure no greater than the planned low side evaporation pressure of the system, which pressure, as will be seen more clearly hereinafter, depends upon the refrigerant selected. The selection of refrigerant is based on its critical temperature. Any fluorinated hydrocarbon refrigerant is suitable. Exemplary of this type of refrigerant are trifluoromethane, dichlorodifluoromethane, chlorotrifluoromethane, tetrafluoromethane, dichlorofluoromethane, chlorodifluoromethane, fluoroform, 1,1,-2-trichloro-1,2,2-trifluoroethane, 1,2-dichloro-1,1,2,2-tetrafluoroethane, chloropentafluoroethane and hexafluoroethane. In addition, a refrigerant such as anhydrous ammonia may be used. Four preferred refrigerants are shown in Table I together with their critical temperature and pressure as well as the recommended operating parameters in accordance with the present invention for the high side temperature and pressure, condensing temperature and pressure and low side temperature and pressure. For automotive, marine and home/office air conditioning applications, the use of Freon-12 and 22 is recommended. For field and commercial food cold storage applications the use of ammonia is recommended. It will be appreciated that the higher the critical temperature of the refrigerant, the higher the possible operating temperature and pressure of the refrigerant system and the greater the thermal efficiency of the system.

When initially charging the system, only compression/heating unit 10 should be charged with refrigerant. To start the system, unit 10 is pressurized by applying heat through heating unit 16. As indicated, any waste energy in the form of heat may be used, however waste exhaust heat from internal combustion engines is particularly preferred. As can be seen most clearly in FIG. 2, when the refrigeration system of the present invention is associated with an automobile or marine internal combustion engine 100, each compression/heating unit 102, 104 includes an exhaust pipe 106, 108, respectively, passing longitudinally between its ends. Exhaust heat flow from the internal combustion engine is channeled through the exhaust manifold 110 of the engine, through Y-gates 112, 114 into exhaust pipes 106, 108 whereby the compression/heating units 102, 104 are heated to pressurize the refrigerant held on the adsorbent material within the units. In all other essential respects, the refrigeration apparatus of FIG. 2 is substantially the same as the apparatus of FIG. 1 and need not be described in detail.

When compression/heating unit 10 attains its internal shut-off temperature, which is less than the critical maximum temperature of the refrigerant in order to preserve its physical properties, the application of heat via heating unit 16 is terminated. Temperatures within compression/heating unit 10 are sensed by thermocouples 54, 56 associated with the unit (thermocouples 58, 60 are associated with unit 12). The thermocouples 54 and 58 which control heating unit shut-off relay their signals through a central relay switch and temperature control unit 62 and actual heat shut-off is accomplished by solenoid actuated valves 64, 66 operatively associated with heater units 16 and 18, respectively. In the preferred embodiment, wherein heat is supplied from an internal combustion engine exhaust manifold through exhaust pipes disposed in the compression/heating units (FIGS. 2 and 3), thermocouple 122 disposed adjacent the inlet 118 of one of the compression/heating units initiates the signal to actuate the solenoid operated valves which close Y-gate 112, 114.

After heat shut-off, as compression/heating unit 10 cools, backflow to the unit on the high pressure side is prevented by check valve 42 in line 20, which valve is set at the system's evaporating pressure. Unit 12 has a corresponding check valve 44 in line 22 associated with it to perform the same function after heat to unit 12 is shut-off. Another check valve 46, with the same setting, is located in line 24 common to both units 10 and 12 upstream of the condenser 26.

TABLE I

| REFRIGERANT | CRITICAL PROPERTIES | | OPERATION REQUIREMENTS | | | | | |
|---|---|---|---|---|---|---|---|---|
| | Temp. | *Pressure | HIGH | | CONDENSING | | LOW | |
| | | | Temp. | *Pressure | Temp. | *Pressure | Temp. | *Pressure |
| Freon-12 dichlorodifluoromethane | 223.6° F | 597.0 | 200° F | 430.09 | 120° F | 172.25 | 34° F | 46.42 |
| Freon-22 monochlorotrifluoromethane | 204.8° F | 716.0 | 180° F | 500.0 | 120° F | 347.0 | 0° F | 38.79 |
| Freon-113 1,1,2-trichloro-1,2,2-trifluoromethane | 417.4° F | 495.0 | 390° F | 400.1 | 120° F | 15.4 | 34° F | 2.64 |
| Anhydrous Ammonia NH$_3$ | 271.4° F | 1657 | 200° F | 1000.0 | 120° F | 286.4 | 0° F | 30.42 |

*All pressures in pounds per square inch absolute

The heated refrigerant from unit 10 passes through check valves 42 and 46 and is cooled in condenser 26 by convective flow of ambient air over the coils of the condenser, which are finned in the conventional manner to facilitate heat extraction. For convective cooling with ambient air to occur, the refrigerant must be heated in the compression/heating units to at least 70 percent of its critical temperature, but generally to no greater than 95 percent of its critical temperature. The 95 percent upper limit is in the nature of a safety limit to insure that the critical temperature is never exceeded. As a practical matter, the fluorocarbon refrigerants need only be heated to from 70 to 90 percent of their critical temperature for efficient operation and preferably are heated to from 80 to 93 percent of critical. With ammonia refrigerants, due to the large increases in pressure incident to temperature increases, heating should be limited to the range 70 to 75 percent of critical. In all cases, refrigerant temperature-pressure limits have been calculated to permit condensation to occur without the additional aid of mechanical devices such as fans and blowers, with an ambient airflow over the coils of 120°F. The dry adsorption refrigeration system of the present invention has been designed to operate with a higher compression temperature than conventional dry adsorption refrigeration systems and is therefore able to condense the refrigerant at a higher temperature compared to conventional systems. Operation at these higher temperatures and pressures allows operation at increased efficiency with the only disadvantage that, in some applications, such as when ammonia is used, heavy-gauge hardware may be necessary.

In order to enhance convective airflow, a generally conical arrangement of the components of the refrigerant system is preferred, as shown in FIG. 5. In the embodiment shown, compression/heating units 80, 82, 84, heating unit 86 and condensing coil 88 are disposed within a generally conical housing 90 spaced from the ground by supports 91. Condensing coil 88 is preferably located at the lower extremity or base portion of the conical structure, below the heat source 86 and the compression/heating units 80, 82, 84 to facilitate ambient airflow through the open bottom 92 of housing 90 and upward over the coils 88. In the operation of the refrigerant system in this configuration, upon application of heat to the compression/heating units, the refrigerant is forced from the units through piping 94 and valve 96 to the center of condenser coils 88. The natural convection effect of the heat generated in the units 80, 82, 84 moving upward through flue pipe 98 in the apex of the conical housing 90 causes ambient air to flow through the open bottom 92 of the housing upwardly over the condensing unit 88, which is preferably spiral in configuration and finned to expedite cooling. After the heated ambient air passes over condenser 88, it exits from the conical housing 90 through flue 98.

After passing through condensing coils 26, the saturated liquid refrigerant is piped via pipe 28 through expansion valve 30 and cooling unit 34 in a conventional manner to extract heat from the space to be cooled. As compression/heating unit 10 cools and compression/heating unit 12 is heating, the low pressure refrigerant returning through line 36 and check valve 48 (consisting of vapor and liquid) will be drawn back to compression/heating unit 10 by the cooling which causes a pressure drop in the unit. Also, the capillary action and adsorption capabilities of the silica gel which is packed in the unit assist the refrigerant's return to the compression/heating units. Check valves 48, 50 and 52 are provided on the low pressure side of the system between the cooling unit 34 and the compression/heating units 10, 12 to assure proper flow back to the units.

Where configurational limitations on the system permit, return of the refrigerant to the compression/heating units 10, 12 may be facilitated by advantageous use of gravity in addition to the heating and cooling, and adsorption effect of the silica gel. Whenever possible, the expansion or throttle valve 30 and evaporative cooling unit 34 should be located as high as possible above the compression/heating units 10, 12 to aid in the return of the refrigerant through check valves 48, 50 and 52. Gravity does not appear to present a problem on the high pressure side of the refrigeration cycle inasmuch as the pressure generated by the heating of the refrigerant within a confined space provides the necessary force to drive the refrigerant through the check valves 42, 44 and 46 and condensing coils 26 to expansion valve 30.

Control of the heating and cooling of the compression/heating units is critical inasmuch as maintenance of pressure on the high side of the refrigeration cycle is required while, at the same time, a low enough pressure on the low side of the cycle is needed to permit return of the refrigerant to the non-heating compression/heating unit. The solenoid operated valves 64, 66 which permit the heat application to the heating units are, therefore, controlled in the following manner. The system is always set up so that initial heat application is to one compression/heating unit only. As hereinbefore indicated, unit 10 is the unit to be heated initially and unit 12 is initially an inactivated unit. A relay switch and temperature control device 62, which can be either electronic or electro-mechanical, is provided to insure that only one compression/heating unit 10, 12 will be in the heating mode at any one time. After the first unit 10 reaches its operating temperature and is shut down, as hereinbefore indicated, the second unit is activated. A low-limit sensor is provided in each of units 10, 12 which prevents heat application to a unit unless the unit temperature is less than 120°F and initiates heat application to a unit when its temperature falls below 120°F. This sensor 56, 60 (shown as 124 in FIG. 3) is attached to the compression/heating unit adjacent the outlet end thereof. The function of this low limit sensor is to provide a time delay, where necessary, to assure cooling down of a unit prior to the next application of heat. This assures return of the refrigerant so that a continuous refrigeration cycle can be maintained.

FIG. 4 illustrates a typical field arrangement of the refrigerant system of the present invention, showing two conical housings 130, 132 (similar to the housing shown in FIG. 5) joined by piping to a common cooling unit 134 (which is preferably cooled by convective currents to conserve power) adapted to cool space 136. Thermocouple-electric control and relay switch operations are accomplished through the use of storage battery power in order to minimize and/or eliminate the electric energy requirements. The fuel switch operation (fuel supply 138 is preferably fuel oil, propane gas, and the like) and the on-and-off operation of the compression/heating units in the field arrangement is accomplished using bi-metal, temperature-actuated fuel valves (not shown) rather than solenoid-actuated valves. Alternatively, an arrangement similar to that disclosed in U.S. Pat. No. 2,544,916 — Coons may be used.

A compression/heating unit adapted to be used in conjunction with and heated by the exhaust of an internal combustion engine is shown in detail in FIG. 3. The unit consists of a generally cylindrical housing 116 having an exhaust pipe 117 disposed substantially concentric therewith along the longitudinal axis of the housing. Pipe 117 includes a plurality of circumferential fins 119 extending therefrom at spaced intervals to more efficiently disperse the heat to the silica gel granules 121 in the space between pipe 117 and housing 116. Refrigerant flow enters housing 116 through inlet 118 and exits through outlet 120. Generally conical screens 123 prevent the silica gel granules from clogging or backing-up into the inlet or outlet lines. As previously described, thermocouple sensor 122 senses the refrigerant temperature within the unit and initiates the signal to shut off heat flow to the unit. Sensor 124 provides an indication of unit temperature adjacent the outlet and is generally adjusted to prevent heat-up of the unit unless the unit has cooled to at least a predetermined temperature, e.g., 120° F.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Dry adsorption refrigeration apparatus including a liquid refrigerant therein comprising:
   a. a plurality of adsorber units, each unit including a charge of adsorbent material therein;
   b. heating means associated with each said unit for intermittent application of heat thereto;
   c. a condenser connected to the outlet of said units, said condenser cooled by convective ambient air flow thereover;
   d. a conical housing for said adsorber units and said condenser, said housing having openings at its base whereby ambient air enters said housing and openings adjacent its apex whereby heated air exits said housing;
   e. evaporator means connected to the condenser outlet to extract heat from the space to be refrigerated; and
   f. means for returning said refrigerant to said adsorber units.

2. Apparatus as claimed in claim 1 further including means on said units for sensing the temperature therein.

3. Apparatus, as claimed in claim 2, wherein said sensing means on said units are associated with said heating means and further including remote means for intermittently operating said heating means in response to a signal from said sensing means.

4. Apparatus, as claimed in claim 1, wherein said evaporator means includes an expansion valve and an evaporator coil.

5. Apparatus, as claimed in claim 1, wherein said heating means comprises pipe means through which heated material passes.

6. Apparatus, as claimed in claim 5, wherein said adsorber unit comprises a housing, said pipe means extends through said housing and said adsorbent material is dispersed within said housing and without said pipe means.

7. Apparatus, as claimed in claim 6, wherein said adsorber units comprise a generally cylindrical housing, said pipe means extends longitudinally within said housing, and said adsorbent material is dispersed in the annular space within said housing surrounding said pipe means.

8. Apparatus, as claimed in claim 7, wherein said adsorbent material is granulated silica gel.

9. Apparatus, as claimed in claim 7, wherein said pipe means includes a plurality of fins extending therefrom within said housing at spaced apart intervals along the length of said pipe means.

10. Apparatus, as claimed in claim 1, wherein said condenser is disposed adjacent the base of said conical housing and said adsorber units are disposed between said condenser and said apex, whereby the upward flow of heated air adjacent said units creates a draft flow of ambient air into said housing through the openings at said base, upward over said condenser and said units, and out of said housing through the openings adjacent said apex.

11. Apparatus, as claimed in claim 10, including supports for said housing along its base to space said housing from the ground.

* * * * *